United States Patent [19]
Gugel et al.

[11] Patent Number: 6,085,175
[45] Date of Patent: Jul. 4, 2000

[54] SYSTEM AND METHOD FOR DETERMINING VALUE AT RISK OF A FINANCIAL PORTFOLIO

[75] Inventors: Leon G. Gugel, Woodhaven; Alexander Tsigutkin, New York, both of N.Y.

[73] Assignee: Axiom Software Laboratories, Inc.

[21] Appl. No.: 09/109,861

[22] Filed: Jul. 2, 1998

[51] Int. Cl.[7] .................................................. G06F 17/60

[52] U.S. Cl. ............................................................ 705/36

[58] Field of Search ........................................ 705/36, 37

[56] References Cited

PUBLICATIONS

Chahal, Mandeep S. & Jun Wang. "Jump Diffusion Processes and Emerging Bond and Stock Markets: An Investigation Using Daily Data". Multinational Finance Journal: Camden, pp. 169–197, Sep. 1997.

*Primary Examiner*—Eric W. Stamber
*Assistant Examiner*—Susanna Meinecke-Díaz
*Attorney, Agent, or Firm*—Edward Etkin, Esq.

[57] ABSTRACT

The present invention provides a system and method for accurately estimating value-at-risk (VAR) of a financial portfolio. The present invention analyzes a distribution of sorted financial data samples to determine an accurate range of upper and lower limits of an expected value of VAR so that an analyst or another financial analysis system may select an appropriate VAR value from the range presented.

28 Claims, 3 Drawing Sheets

SYSTEM AND METHOD FOR DETERMINING VALUE AT RISK OF A FINANCIAL PORTFOLIO

BACKGROUND OF THE INVENTION

1. Field of the Invention

This invention pertains to a system and method for analyzing financial risk data. More particularly, the present invention relates to system and method for determining a value at risk of a financial portfolio.

2. Description of the Related Art

Modern markets are filled with pitfalls for unwary investment institutions and lenders. A value at risk ("VAR") of a particular financial portfolio is an important consideration for any financial institution engaged in investment and/or lending operations. The VAR of a portfolio indicates the portfolio's market risk. In other words, the VAR is the greatest possible loss that the institution may expect in the portfolio in question with a certain given degree of probability during a certain future period of time. Typically, a financial institution will put aside a certain percentage of the VAR as a contingency amount to cover possible losses in the portfolio in a predetermined upcoming time period. Thus, the accuracy of VAR estimation is of utmost importance since the funds set aside to cover the VAR are not generating any income for the institution. Furthermore, if the estimation of VAR is too low, the institution may expose itself to a highly undesirable situation where it does not have enough funds set aside to cover a portfolio loss.

As a result, two major approaches have been developed to provide an accurate estimation of VAR for a portfolio. For both approaches, a predetermined number of financial data samples are generated using appropriate simulation methods, e.g. Monte Carlo, Historical simulation, etc. The samples are then ordered from largest gain/smallest loss to largest loss or vice versa. First, a certain predetermined probability percentage called confidence level ("CL") is selected by an analyst to define a desired confidence level for VAR estimation. Typically CL is approximately 95% or higher. Then, the set of samples is analyzed to estimate the VAR value. It is assumed that probability CL future losses will not exceed this value with probability CL.

The first approach is called the percentile method. This approach assumes that VAR is equal to the lowest loss of (100−CL) % of highest losses in the set of samples. For example, assuming that CL is set to 95% and there are 100 samples in a set sorted from the smallest loss to the largest loss, and 6 largest losses (in millions) are 65, 65, 95, 95, 97, and 1000. Then, VAR will be $65 million, because there are less than 5% of samples with value of loss that is higher than 65 million. While this approach has the advantage of relative simplicity it is flawed because the VAR value is based on the only one sample value that happened to be on the border of (100−CL) % of samples in the set analyzed. If for example, in the set under consideration only one sample has changed its value and 6 largest losses (in millions) are 65, 88, 95, 95, 97, and 1000, then for the same portfolio, VAR would still be $65 million.

The second approach is similar to the percentile approach except that the losses in the (100−CL) percentile are averaged to obtain the VAR. This approach is also problematic because if even one unusually high loss happened to be among the losses, the value of VAR will be skewed to an undesirably high value because the unusually high loss will affect the average. For example, in the set above, use of this VAR estimation method returns VAR of an unreasonable high value of 256 million.

It would thus be desirable to provide a system and method for accurately determining a VAR for a financial portfolio that is not adversely affected by uneven or skewed distribution of loss samples. It would further be desirable to provide estimation of limits of possible values of VAR so that an analyst or an additional financial data analysis system may estimate the accuracy of VAR value calculated.

SUMMARY OF THE INVENTION

The present invention provides a system and method for estimating value-at-risk (VAR) of a financial portfolio. More particularly, a range of upper and lower limits of an expected value of VAR are determined in accordance with the present invention so that an analyst or another financial analysis system may estimate the accuracy of VAR value selected.

Before describing the present invention in greater detail it would be helpful to define the various variables and values used in the system and method of the present invention. An analyst is a representative of a financial institution or an independent individual that is engaged in estimating a VAR (hereinafter "$V_A$") for a particular financial portfolio (hereinafter "portfolio"). It is presumed that the portfolio has an unknown function of probability distribution of its future possible returns and future losses that may occur during a certain period of time (e.g. daily, weekly, etc.) in the future. The $V_A$ is a specific value of possible future portfolio losses. A time horizon is the period of time during which these future losses may occur. A confidence level ("CL") is the probability that any possible future losses occurring during the given time horizon will be less than the corresponding $V_A$ value. The CL is measured in percents and usually is about 95%–99%. Thus, the $V_A$ of the portfolio is a specific value of possible future losses corresponding to particular specified time horizon and CL values. The variable N, selected by the analyst, represents the number of samples of possible returns of the portfolio (hereinafter "V samples") corresponding to the time horizon chosen (typically one day). Preferably, the V samples are sorted from largest loss to smallest (or from largest loss to a largest gain). The V samples may be obtained by any known simulation method such as Historical or Monte-Carlo simulation, etc. Each V sample is assumed to correspond to a particular point in an ordered distribution of N V samples in accordance with its magnitude.

The variable A, also selected by the analyst, represents an acceptable probability that some possible future portfolio loss is greater than a target $V_A$ that is to be estimated in accordance with the present invention. Thus, the value of 1−A corresponds to the CL defined above. An A-tail is a portion of an unknown distribution of future values of losses that has a border point that corresponds to the value of $V_A$ and that extends from that border point to the greatest possible loss. For example, for a given value of $V_A$=100 million, this loss and all other larger losses (105 million, 110 million, etc.) represent the A-tail. Thus, it is assumed that any future loss that is equal to or exceeds $V_A$ and falls into the A-tail can occur with a probability less than or equal to A.

An S-tail is a portion of the distribution of the actual V samples that includes the points that correspond to A (in %) of the largest V samples. If there are N samples in the set of samples analyzed, then a variable $n_A = A*N$ represents the border of S-tail. In the percentile method described above, the V sample corresponding to the $n_A$ was considered to be the portfolio $V_A$ for the given time horizon. Thus, it is assumed that any loss that exceeds $V_S$, the V sample corresponding to the point nA, falls into the S-tail.

One of the objectives of the present invention in determining $V_A$, is to find the probability that sample $n_A$ will actually correspond to the border point of the expected A-tail, and thus correspond to $V_A$. This probability value is calculated using a binomial (Bernoulli) distribution which is well known in the art, but which is represented below for convenience:

$$P_K = \binom{N}{K} A^K (1-A)^{N-K}$$

Where K is the number of points that fall within the A-tail. Theoretically, the possible range of K is 1 to N. However, it is highly likely that only a relatively small amount of points have a significant probability of falling into the A-tail. Thus, to avoid unnecessary calculations it would be advantageous to identify a range of K values from $K_{min}$ to $K_{max}$ that corresponds to V samples that together have an acceptably high probability of falling into the A-tail. This high probability is represented by $P_T$ and is preferably selected by the analyst. In essence, the value of $P_T$ corresponds to the accuracy of calculation provided to determine range of limits for expected value of $V_A$. Preferably it should also correspond to the value of CL used in $V_A$ calculation. For demonstration purposes of our examples, CL=95% and the value of $P_T$ of 98% is chosen. The variable $P_K$ is the probability that the V sample at point K (hereinafter "$V_K$") falls into the A-tail. Thus, a summation of all $P_K$ for $K_{min}$ to $K_{max}$ should be approximately equal to $P_T$. This arrangement is advantageous because it ensures that computation time is saved by not performing the calculations for values of K which correspond to samples that have a very low probability of falling into the A-tail. The values of $K_{min}$ to $K_{max}$ along with values of $P_K$ and appropriate $V_K$ sample values may then be used to determine the range of expected values of $V_A$ in accordance with the present invention.

The present invention provides a risk analysis system for estimating value at risk of a financial portfolio. The risk analysis system may operate automatically, or under control or direction of the analyst. The operation of the risk analysis is controlled by a control system for executing control program instructions that are stored in a memory. The memory preferably includes a long term storage memory for storing data, such as portfolio information, and control programs and a short term program memory for temporarily storing control program instructions and variables during the execution of the control program by the control system.

An input device for enabling the analyst to supply data and/or variables to the risk analysis system is connected to the control system. Optionally, the input device includes a communication line to another data processing system from which new data and/or variables may be retrieved by the control system. The risk analysis system also includes an output device for providing results of control programs executed by the control system to the analyst. Optionally, the output device includes a communication line for transmitting the results to another data processing system (not shown) for storage or processing by other financial analysis software. The output device may also be used for monitoring, by the analyst, of the execution of the control program instructions by the control system.

In a preferred embodiment of the invention, the control system determines N number of V samples related to the target portfolio using a known simulation method, e.g. Historical simulation, Monte Carlo simulation, etc. The control system sorts the V samples from the biggest loss to the smallest loss or vice versa. The control system then determines whether $K_{min}$ and $K_{max}$ for the particular currently used sample size N are stored in the memory from some previous use of the system. If appropriate $K_{min}$ and $K_{max}$ are known, the control system determines the lowest and highest limit values of expected value of $V_A$, and then outputs them to the analyst or to an additional financial analysis system. If $K_{min}$ and $K_{max}$ are not known for the current sample size N, the control system determines $K_{min}$ and $K_{max}$ by calculating and adding to one another values of $P_K$ at various sequentially determined values of K, until the sum of $P_K$ values equals or exceeds $P_T$. The values of $K_{min}$ and $K_{max}$ for the current sample size N are then stored in the memory for future use by the control system. The control system then determines the lowest and highest limit values of expected value of $V_A$ using the just determined values of $K_{min}$ and $K_{max}$ and then outputs the limit values to the analyst or to an additional financial analysis system.

In another embodiment of the invention, instead of calculating $K_{min}$ and $K_{max}$ or retrieving them from memory, $K_{min}$ may be set to "1" and $K_{max}$ may be set to N. In this manner a more precise range of limit values for $V_A$ is obtained, but at the cost of significant expenditure of system resources.

BRIEF DESCRIPTION OF THE DRAWINGS

The above and further features, advantages and benefits of the invention will become apparent in the following description taken in conjunction with the following drawings. It is to be understood that the foregoing general description and the following detailed description are exemplary and explanatory but are not intended to be restrictive of the invention. The accompanying drawings, which are incorporated in and constitute a part of this disclosure, illustrate one of the embodiments of the invention and, together with the description, serve to explain the principles of the invention in general terms. Like numerals refer to like parts throughout the disclosure.

DETAILED DESCRIPTION OF THE PRESENTLY PREFERRED EMBODIMENTS

Figure 1:
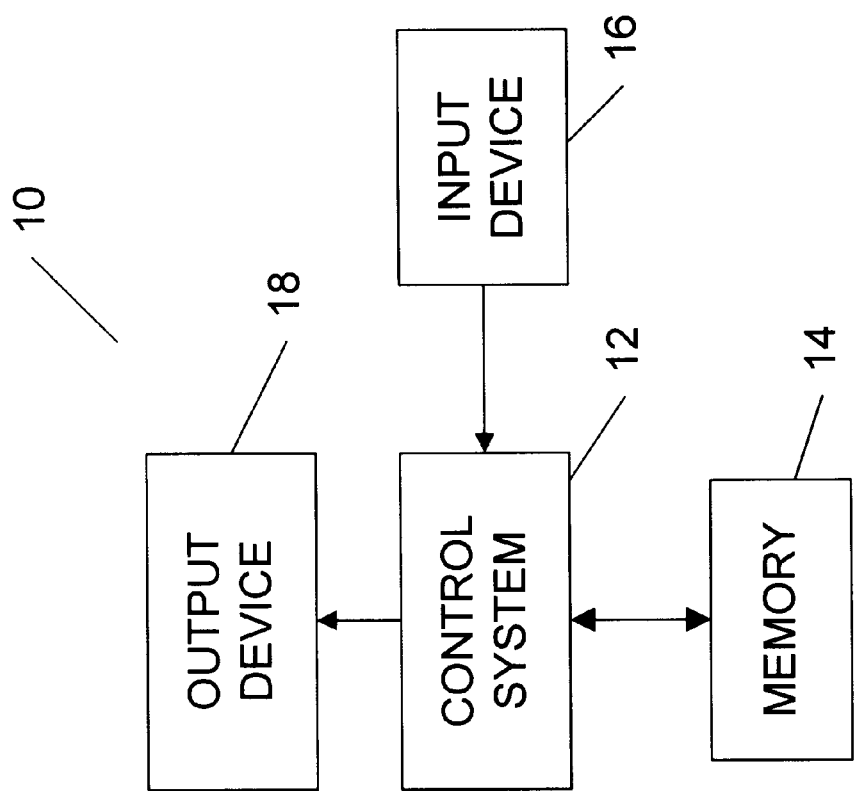
FIG. 1 is a block diagram of a risk analysis system in accordance with the principles of the present invention.

Before describing the present invention in greater detail it would be helpful to define the various variables and values used in the system and method of the present invention. An analyst is a representative of a financial institution or an independent individual that is engaged in estimating a VAR (hereinafter "$V_A$") for a particular financial portfolio (hereinafter "portfolio"). It is presumed that the portfolio has an unknown function of probability distribution of its future possible returns and future losses that may occur during a certain period of time (e.g. daily, weekly, etc.) in the future. The $V_A$ is a specific value of possible future portfolio losses. A time horizon is the period of time during which these future losses may occur. A confidence level ("CL") is the probability that any possible future losses occurring during the given time horizon will be less than the corresponding $V_A$ value. The CL is measured in percents and usually is about 95%–99%. Thus, the $V_A$ of the portfolio is a specific value of possible future losses corresponding to particular specified time horizon and CL values. The variable N, selected by the analyst, represents the number of samples of is possible returns of the portfolio (hereinafter "V samples") corresponding to the time horizon chosen (typically one day). Preferably, the V samples are sorted from largest loss to smallest (or from largest loss to a largest gain). The V samples may be obtained by any known simulation method such as Historical or Monte-Carlo simulation, etc. Each V sample is assumed to correspond to a particular point in an ordered distribution of N V samples in accordance with its magnitude. For example, if N is 100 and the V samples are ordered in descending manner, then the largest V sample will be at point 1, the next largest will be at point 2, and so on.

The variable A, also selected by the analyst, represents an acceptable probability that some possible future portfolio loss is greater than a target $V_A$ that is to be estimated in accordance with the present invention. Thus, the value of 1−A corresponds to the CL defined above. An A-tail is a portion of an unknown distribution of future values of losses that has a border point that corresponds to the value of $V_A$ and that extends from that border point to the greatest possible loss. For example, for a given value of $V_A$=100 million, this loss and all other larger losses (105 million, 110 million, etc.) represent the A-tail. Thus, it is assumed that any future loss that is equal to or exceeds $V_A$ and falls into the A-tail can occur with a probability less than or equal to A.

An S-tail is a portion of the distribution of the actual V samples that includes the points that correspond to A (in %) of the largest V samples. If there are N samples in the set of samples analyzed, then a variable $n_A = A*N$ represents the border of S-tail. In the percentile method described above, the V sample corresponding to the nA was considered to be the portfolio $V_A$ for the given time horizon. Thus, it is assumed that any loss that exceeds $V_S$, the V sample corresponding to the point $n_A$, falls into the S-tail. For example, if there are 100 V samples of returns with five largest losses equal to 65, 95, 95, 97, and 1000 million, for A=5% and $n_A$=5, the S-tail begins at the $5^{th}$ largest loss $V_S$, in this case 65 million, and includes all V samples up to 1 billion.

One of the objectives of the present invention in determining $V_A$, is to find the probability that $V_S$, the V sample at point $n_A$ will actually correspond to the border point of the expected A-tail, and thus correspond to $V_A$. This probability value is calculated using a binomial (Bernoulli) distribution which is well known in the art, but which is represented below for convenience:

$$P_K = \binom{N}{K} A^K (1-A)^{N-K}$$

Where K is the number of points that fall within the A-tail Examples of results of determination of such a probability are shown in exemplary Table 1 below for various values of N, given that A is 0.05, given $n_A$ set to A*N and given K set to $n_A$.

TABLE 1

Probability that $n_A$ is actually the border point of the A-tail.
(A = 0.05, $n_A$ = A*N, K = $n_A$)

| Sample Size N | 100 | 250 | 500 | 1000 | 5000 | 10,000 |
|---|---|---|---|---|---|---|
| Probability (%) | 18 | 11.6 | 8.2 | 5.8 | 2.6 | 1.8 |

Theoretically, the possible range of K is 1 to N. However, it is highly likely that only a relatively small amount of points have a significant probability of falling into the A-tail. Thus, to avoid unnecessary calculations it would be advantageous to identify a range of K values from $K_{min}$ to $K_{max}$ that corresponds to V samples that together have an acceptably high probability of falling into the A-tail. This high probability is represented by $P_T$ and is preferably selected by the analyst. For example, $P_T$ may be selected from a range from 90% to 99%. In essence, the value of $P_T$ corresponds to the accuracy of calculation provided to determine range of limits for expected value of $V_A$. Preferably it should also correspond to the value of CL used in $V_A$ calculation. For demonstration purposes of our examples, CL=95% and the value of $P_T$ of 98% is chosen. The variable $P_K$ is the probability that the V sample at point K (hereinafter "$V_K$") falls into the A-tail. Thus, a summation of all $P_K$ for $K_{min}$ to $K_{max}$ should be approximately equal to $P_T$. This arrangement is advantageous because it ensures that computation time is saved by not performing the calculations for values of K which correspond to samples that have a very low probability of falling into the A-tail. For example, if the analyst sets N to 1000, then 1000 values of possible returns will be calculated for the portfolio using some known simulation method. Each V sample is assumed to correspond to a particular point in an ordered distribution of N V samples in accordance with its magnitude. For example, if N is 100 and the samples are ordered in descending manner, then the largest V sample will be at point 1, the next largest will be at point 2, and so on. The values of $K_{min}$ to $K_{max}$ along with values of $P_K$ and appropriate $V_K$ sample values may then be used as discussed below in connection with FIGS. 2–3 to determine the range of expected values of $V_A$.

Referring initially to FIG. 1, a risk analysis system 10 for estimating value at risk of a financial portfolio is shown. The risk analysis system 10 may operate automatically, or under control or direction of the analyst. The operation of the risk analysis 10 is controlled by a control system 12, such as a computer system or a network of computer systems, for executing control program instructions that are stored in a memory 14. The memory 14 preferably includes both long and short term memory. A long term storage memory, such as a hard disk drive, an array of disk drives, or any other type of storage memory device, e.g. optical disks (not shown) is used for storing data such as portfolio information and control programs. Short term memory, e.g. such as RAM (not shown) is used for temporarily storing control program instructions and variables during the execution of the control program by the control system 12.

An input device 16 connected to the control system 12, can contain such devices for manual input as a keyboard, enabling the analyst to supply data and/or variables to the risk analysis system 10. Optionally, the input device 16 may include a communication line to another data processing system (not shown) from which new data and/or variables may be retrieved by the control system 12. An output device 18, such as a display monitor and/or a printer, is used for providing results of control programs executed by the control system 12 to the analyst. Optionally, the output device 18 includes a communication line for transmitting the results to another data processing system (not shown) for storage or processing by other financial analysis software. The output device 18 may also be used for monitoring, by the analyst, of the execution of the control program instructions by the control system 12.

The operation of the risk analysis system 10 is generally controlled by the control program stored in the memory 14, and executed by the control system 12. This control program typically consists of multiple integrated program modules, with each module bearing responsibility for controlling one or more functions of the risk analysis system 10. For example, one program module may control determination of N number of V samples from historical data or generation of the samples using Monte Carlo or other simulation techniques, while another may control the determination of $K_{min}$ and $K_{max}$. In effect, each program module is a control program dedicated to a specific function or set of functions of the risk analysis system 10.

Figure 2:
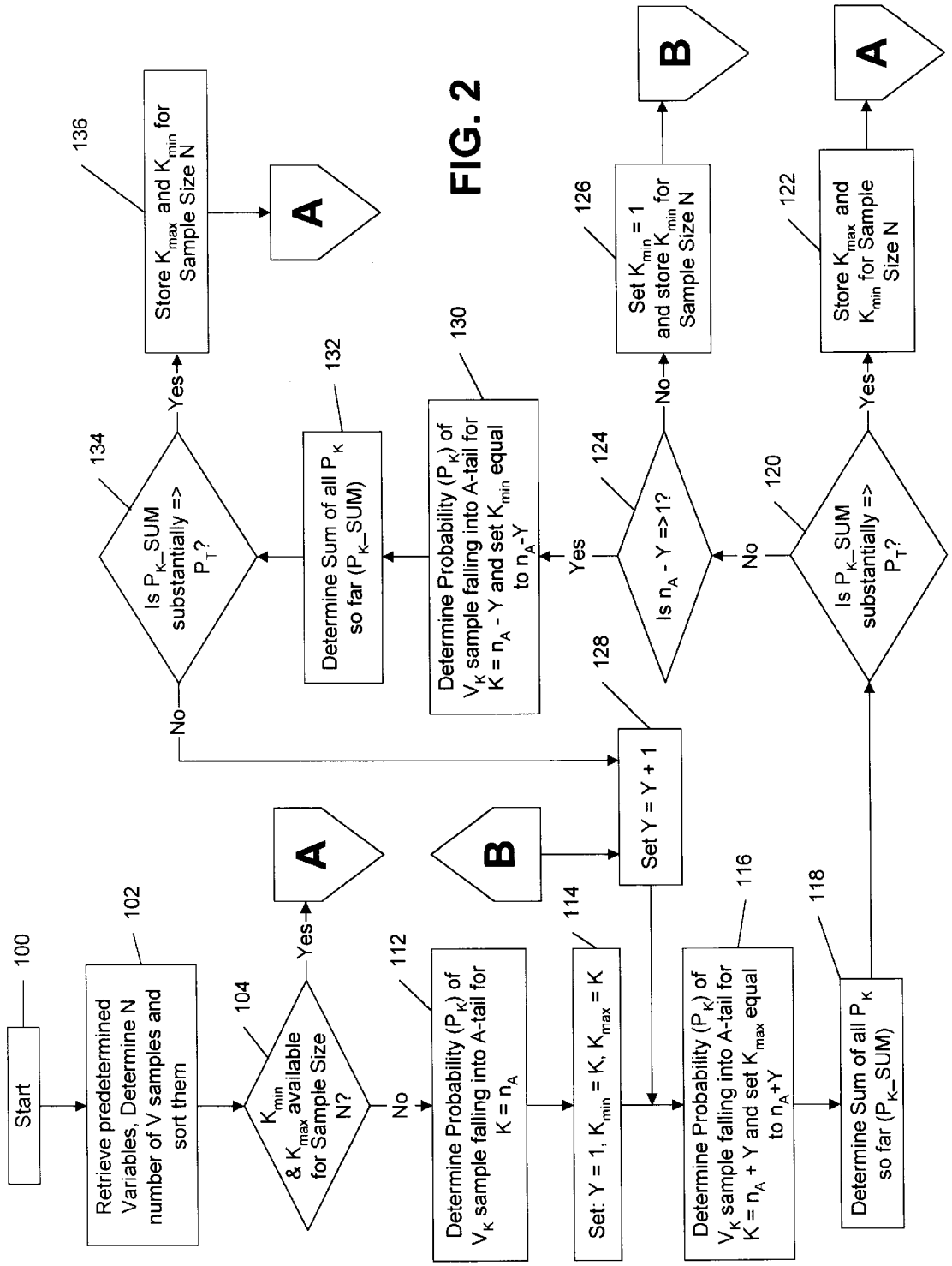
FIGS. 2–3 are representative of a logic flow diagram of a control program for estimating value at risk of a financial portfolio, executed by the control system of the risk analysis system of FIG. 1, in accordance with the principles of the present invention.
Figure 3:
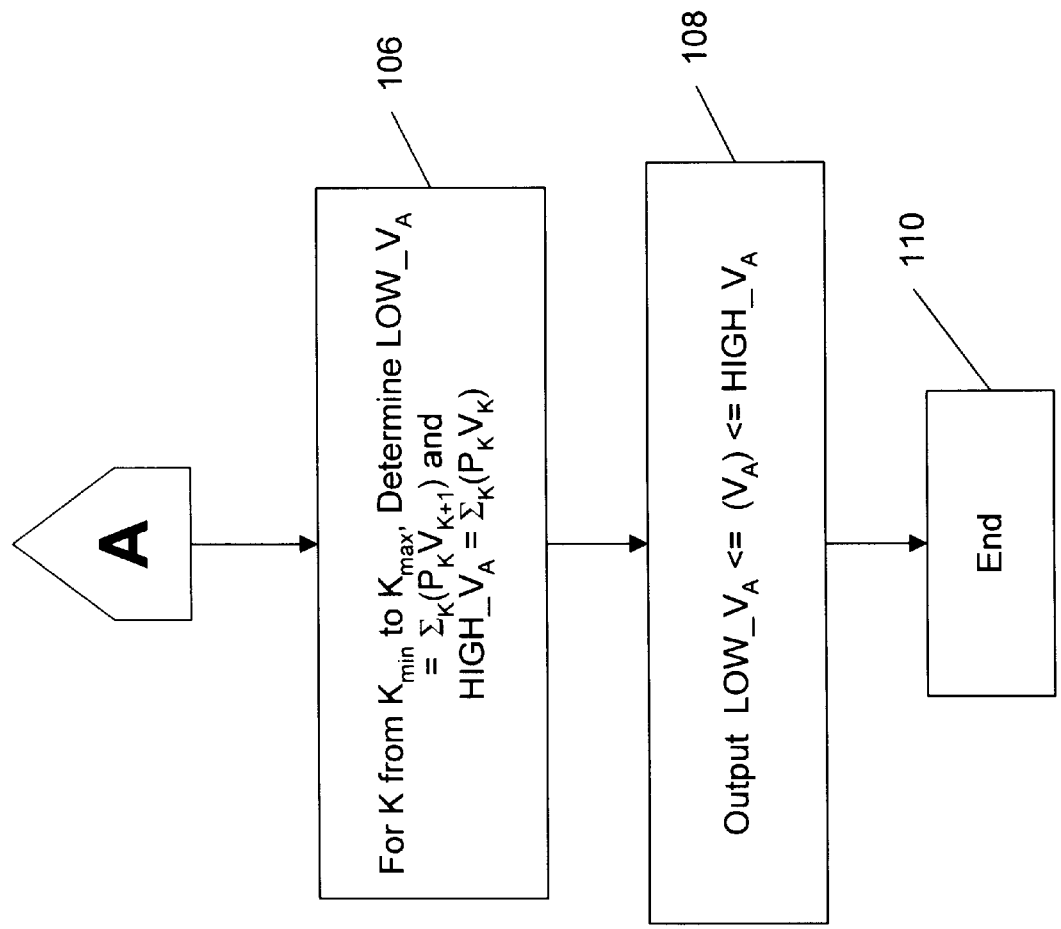

FIGS. 2–3 depict a logic flow diagram representing a first embodiment of a control program for controlling the determination of $V_A$ for the target portfolio that is executed by the control system 12 in accordance with the present invention. In accordance with the invention, predetermined values of sample size N, confidence level CL, and $P_T$ are supplied by the analyst or another data processing system prior to initiation of the control program. The variable $n_A$ is also supplied or, optionally, calculated by the control system 12 as an integer value closest to $0.01*(100-CL)*N$. After the program begins at the step 100, at the step 102 the control system 12 determines N number of V samples of the target portfolio returns using any appropriate simulation method, e.g. such as well known Historical simulation or Monte Carlo simulation methods, and then sorts the V samples from the biggest loss to the smallest loss sample or to the greatest gain if the latter is available.

At a test 104, the control system 12 determines whether $K_{min}$ and $K_{max}$ for the particular currently used sample size N, confidence level CL, and $P_T$ are stored in the memory 14. For example for $P_T$ of 98%, N of 1000, and CL=95% $K_{min}$ is 35 and $K_{max}$ is 65 as is shown below in Table 4. Thus, if the currently used set of values (N, CL and $P_T$) were taken for the target portfolio at some previous time, the appropriate $K_{min}$ and $K_{max}$ are be known and do not need to be recalculated. If $K_{min}$ and $K_{max}$ are available, then the control system 12 proceeds to a step 106. At the step 106, the control system 12 determines LOW_$V_A$, a lowest limit of an expected value of $V_A$, in accordance with the following expression:

$$LOW_{13}V_A = \Sigma_K(P_K V_{K+1}) \text{ for } K \text{ ranging from } K_{min} \text{ to } K_{max};$$

Where $V_K$ is the V sample value at the point K. The control system 12 also determines HIGH$_{13}$ $V_A$, a highest limit of the expected value of $V_A$, in accordance with the following expression:

$$HIGH\_V_A = \Sigma_K(P_K V_K) \text{ for } K \text{ ranging from } K_{min} \text{ to } K_{max};$$

Where $V_K$ is the V sample value at the point K. Thus, at the step 106, the control system 12 determines the highest and lowest limits of the expected value of $V_A$. Accordingly, at a step 108, the control system 12 outputs the range of limits of the expected value of $V_A$, the value of CL corresponding to the expected $V_A$ value, and probability $P_T$ for $V_A$ to be inside of this range of limits. For example, the range LOW_$V_A$<=$V_A$<=HIGH_$V_A$, as well as CL and $P_T$ may be displayed to, or printed out for the analyst on the output unit 18. Optionally, this data may be transmitted to another data processing system for storage or further analysis. The analyst or the other data processing system may then select an appropriate or desired expected value for $V_A$ from the range provided by the control system 12 at the step 108, thus accomplishing the objective of the present invention. The control system 12 then ends the operation of the control program at a step 110.

Alternately, instead of relying on values of $K_{min}$ and $K_{max}$ from previous determinations, $K_{min}$ may be set equal to 1 and $K_{max}$ may be set equal to N. This arrangement will produce the most accurate results for $V_A$ corresponding to $P_T$=100%. However, as explained above, this approach will unnecessarily drain the computing resources of the risk analysis system 10.

If at the test 104, the control unit 12 determines that $K_{min}$ and $K_{max}$ are not available for the current sample size N, the control unit 12 proceeds to a step 112. In summary, during steps 112 to 136, the control system 12 determines $K_{min}$ and $K_{max}$ for the current sample size N in accordance with the known predetermined values of $n_A$ and $P_T$. At the step 112, the control system 12 determines the probability $P_K$ that the $V_K$ sample at the K=$n_A$ point falls into the A-tail. As shown above in Table 1, this $P_K$ will be larger than for any other value of K. At the a step 114, the control system 12 sets a variable Y equal to 1. The variable Y is used by the control system 12 to repeatedly adjust values of K for the purpose of performing calculations to determine $K_{min}$ and $K_{max}$. At the step 114, $K_{min}$ and $K_{max}$ are also initialized by being set equal to the current value of K, which is $n_A$.

At a step 116, the control system 12 determines the probability $P_K$ that the $V_K$ sample at the K=$n_A$+Y point falls into the A-tail and sets $K_{max}$ equal to $n_A$+Y. Thus, during the first iteration of this portion of the control program, if $n_A$ is for example "5", then at the step 116, the control system 12 determines probability $P_K$ that a $V_K$ sample at point K=6 falls into the A-tail. Then, at a step 118, the control system 12 determines $P_K$_SUM, the sum of all $P_K$ values calculated so far. The result of the step 118 indicates the total probability of all $V_K$-samples examined so far falling into the A-tail.

At a test 120, the control system 12 determines whether the $P_K$_SUM value is greater than or equal to $P_T$. If the $P_K$_SUM value is greater than or equal to $P_T$, then the control system 12 proceeds to a step 122 where it stores, in the memory 14, current values of $K_{min}$ and $K_{max}$ for the current sample size N. Thus, if the same set of input parameters (sample size N, confidence level CL, and accuracy of calculation $P_T$) is chosen at some future time, the values of $K_{min}$ and $K_{max}$ stored for this sample size will be available for use in the step 106. As a result, steps 112 to 134 may be avoided. The control system 12, then proceeds to the step 106 where it determines the lowest and highest limits of expected value of $V_A$ before providing output of these limits at the step 108 and ending the control program at the step 110.

If at the test 120, the control system 12 determines that the $P_K$_SUM value is not greater than or equal to $P_T$, then the control system 12 proceeds to a test 124 where it determines whether $n_A$−Y is greater than or equal to "1". Test 124 is necessary because of the following reason. All samples $V_K$ in the set of N V samples are indexed from 1 to N. So k=1 is the smallest value of K that has a meaningful index value for sample $V_K$. If $n_A$ is relatively small (as it would be for a small N), the value of $n_A$−Y may fall below 1 at some later iteration of the control program. Because value is not a meaningful one, this situation should be avoided. Accordingly, the test 124 ensures that such situation does not occur by preventing execution of steps 130 to 134 if the value of $n_A$−Y falls below 1. Thus, if the value of $n_A$−Y is less than 1, then, the control system 12 proceeds to a step 126 where $K_{min}$ is set to "1" and then stored in the memory 14 for the current sample size N.

The control system 12 then proceeds to a step 128 where it increments the variable Y by 1 before returning to the step 116. On the other hand, if the value of $n_A$−Y is greater than or equal to 1, then the control system 12 proceeds to a step 130 where it determines the probability $P_K$ that the $V_K$ sample at the K=$n_A$-Y point falls into the A-tail and sets $K_{min}$ equal to $n_A$-Y. Thus, during the first iteration of the step 130, if $n_A$ is, for example, "5", then at the step 130 the control system 12 determines $P_K$ that a $V_K$ sample at point K=4 falls into the A-tail. Then, at a step 132, the control system 12 determines $P_K$_SUM, the sum of all $P_K$ values calculated so far. The result of the step 132 indicates the total probability of all $V_K$-samples examined so far falling into the A-tail.

At a test 134, the control system 12 determines whether the $P_K$_SUM value is greater than or equal to $P_T$. If the $P_K$_SUM value is greater than or equal to $P_T$, then the control system 12 proceeds to a step 136 where it stores, in the memory 14, current values of $K_{min}$ and $K_{max}$ for the current sample size N. before proceeding to the step 106. If, on the other hand, the $P_K$_SUM value is not greater than or equal to $P_T$, then the control system 12 proceeds to the step 128. In this manner, steps 116 to 120 and steps 124 to 134 are repeated until the sum of all $P_K$ values determined during the repetitions is found to equal to exceed $P_T$. In essence, after the control system 12 determines $P_K$ for K=$n_A$ at the step 112, it continually calculates $P_K$ values for V samples at K values that are incrementally higher and lower than $n_A$ until the total of all $P_K$ values calculated for V samples at various values of K equals or exceeds $P_T$.

Exemplary tables 2 to 5 below show the values of $P_K$ for V samples at different K points for various sample sizes N determined in accordance with the invention. The tables 2 to 5 also show results of several exemplary determinations of $K_{min}$ and $K_{max}$ values for various sample sizes N and for various desired $n_A$ and $P_T$ values.

TABLE 2

(N = 100, CL = 95%, $n_A$ = 5, $P_{tab}$ = 98%, $K_{min}$ = 1, $K_{max}$ = 10)

| K | 1 | 2 | 3 | 5 | 6 | 7 | 8 | 9 | 10 |
|---|---|---|---|---|---|---|---|---|---|
| $P_K$ (%) | 3.1 | 8.1 | 14.0 | 18.0 | 15.0 | 10.6 | 6.5 | 3.5 | 1.7 |

TABLE 3

(N = 250, CL = 95%, $n_A$ = 12, $P_{tab}$ = 98%, $K_{min}$ = 5, $K_{max}$ = 20)

| K | 5 | 6 | 8 | 10 | 12 | 14 | 16 | 19 | 20 |
|---|---|---|---|---|---|---|---|---|---|
| $P_K$ (%) | 0.9 | 1.8 | 5.4 | 9.6 | 11.6 | 10.0 | 6.4 | 2.0 | 1.2 |

TABLE 4

(N = 1,000, CL = 95%, $n_A$ = 50, $P_{tab}$ = 98%, $K_{min}$ = 35, $K_{max}$ = 65)

| K | 35 | 38 | 42 | 46 | 50 | 53 | 58 | 62 | 65 |
|---|---|---|---|---|---|---|---|---|---|
| $P_K$ (%) | 0.5 | 1.3 | 13.1 | 5.1 | 5.8 | 5.1 | 2.8 | 1.3 | 0.6 |

TABLE 5

(N = 10,000, CL = 95%, $n_A$ = 500, $P_{tab}$ = 97%, $K_{min}$ = 453, $K_{max}$ = 547, $n_A$ = 500)

| K | 453 | 461 | 474 | 490 | 500 | 510 | 525 | 539 | 547 |
|---|---|---|---|---|---|---|---|---|---|
| $P_K$ (%) | 0.2 | 0.4 | 0.9 | 1.7 | 1.8 | 1.6 | 0.9 | 0.4 | 0.2 |

Thus, a system and method for determining a value at risk value of a financial portfolio based on value at risk determination of the sample data are shown and described.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. It should be understood that the order of sorting sample data (from biggest loss to the smallest loss or the biggest gain as have been described above, or vice versa) is insignificant because both cases can be mapped one into another simply by substituting indexes of V samples $V_K$ from K to N-K. It should be also obvious that methodology described above can be applied to calculated expected values of various types of financial portfolio risk including Market Risk (VAR), credit risk (CVAR), or any other types of risk that can be quantified in the similar manner, so all combinations of elements and/or method steps which perform substantially the same function in substantially the same way to achieve the same results for estimating various types of portfolio risk are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A data processing system for assisting in a financial risk analysis of a financial portfolio by determining a range of an expected value of a value-at-risk ($V_A$) of a financial portfolio, the range having a low limit value and a higher limit value, the financial portfolio comprising a plurality of ordered financial data samples ($V_K$), the system comprising:

input means for receiving said plurality of samples $V_K$;

first control means, connected to said input means for determining:

(1) the low limit value of $V_A$(LOW_$V_A$) in accordance with a following expression:

$$\text{LOW\_}V_A = \Sigma_K(P_K V_{K+1})$$

wherein K is a predetermined variable corresponding to a position of a particular sample $V_K$ in the ordered plurality of samples $V_K$, said K variable ranging from a lower predetermined value $K_{min}$ to a higher predetermined value $K_{max}$, wherein $P_K$ is a probability value determined for each particular value of K in accordance with a following expression:

$$P_K = \binom{N}{K} A^K (1-A)^{N-K};$$

wherein A is a predetermined variable representative of desired accuracy of $V_A$ determination, and wherein N is a value representative of an amount of $V_K$ samples in the plurality of ordered samples $V_K$, and (2) the high limit value of $V_A$(HIGH_$V_A$) in accordance with a following expression:

$$\text{HIGH\_}V_A = \Sigma_K(P_K V_K)$$

for said variable K ranging from said value $K_{min}$ to said value $K_{max}$; and output means connected to said first control means for providing an output of the range of expected values of $V_A$, the range comprising the low limit value LOW$_{13}$ $V_A$ and the high limit value HIGH__$V_A$, such that said range of expected values of $V_A$ is available for utilization, by at least one of a financial analyst or a secondary financial analysis data processing system, for decision making in connection with the financial portfolio.

2. The system of claim 1, wherein said value $K_{min}$ is set to 1, and wherein said value $K_{max}$ is set to said value N.

3. The system of claim 1, further comprising:

first determining means for determining a value of $P_K$ for K equal to a predetermined variable $n_A$;

defining means, responsive to said first determining means, for setting a variable Y equal to 1, and for setting said values $K_{min}$ and $K_{max}$ to equal $n_A$;

second control means, responsive to said defining means, for determining said values of $K_{min}$ and $K_{max}$, comprising:

second determining means for determining a value of $P_K$ for K equal to $n_A+Y$;

third determining means, responsive to said second determining means, for determining a sum of all $P_K$ values determined thus far;

third control means, responsive to said third determining means, for comparing said sum to a predetermined value $P_T$, and when said sum is one of substantially equal to and greater than said value $P_T$, setting $K_{max}$ equal to $n_A+Y$;

first trigger means, responsive to said third control means, for triggering, when said sum is less than said value $P_T$:

(1) said second determining means to determine a value of $P_K$ for K set equal to $n_A-Y$, and (2) said third determining means to determine a sum of all $P_K$ values determined thus far;

(3) said third control means to compare said sum to said predetermined value $P_T$, and when said sum is one of substantially equal to and greater than said value $P_T$, setting $K_{min}$ equal to $n_A-Y$, and setting $K_{max}$ equal to $n_A+Y$;

increment means, responsive to said third control means, for incrementing said variable Y by when said sum is less than said value $P_T$; and second trigger means, responsive to said third control means, for triggering said second determining means when said sum is less than said value $P_T$.

4. The system of claim 3, wherein said third control means further comprises: means for determining whether $n_A-Y$ is one of less than or equal to 1; and means for, when $n_A-Y$ is one of less than or equal to 1, setting $K_{min}$ equal to 1, and deactivating said first trigger means.

5. The system of claim 3, further comprising memory means for storing said values $K_{min}$ and $K_{max}$ in association with said value N, such that at a later time said $K_{min}$ and $K_{max}$ will be known for said value N.

6. The system of claim 5, further comprising means for determining, prior to activation of said first control means, whether said values $K_{min}$ and $K_{max}$ are stored in said memory means for said value N, and:

(1) when said values $K_{min}$ and $K_{max}$ are stored in said memory means for said value N, retrieving said values $K_{min}$ and $K_{max}$ from said memory means and triggering said first control means; and (2) when said values $K_{min}$ and $K_{max}$ are not stored in said memory means for said value N, triggering said first determining means to determine values $K_{min}$ and $K_{max}$, and, after said values $K_{min}$ and $K_{max}$ are determined, triggering said first control means.

7. A data processing system for assisting in a financial risk analysis of a financial portfolio by determining a range of an expected value of a value-at-risk ($V_A$) of a financial portfolio representative of financial data, the range having a low limit value and a higher limit value, the system comprising:

memory means for storing the financial portfolio;

simulation means for generating a plurality of financial data samples ($V_K$) of variable magnitude from said financial portfolio;

sorting means for ordering said samples $V_K$ from smallest to largest in magnitude;

first control means, connected to said sorting means for determining:

(1) the low limit value of $V_A$(LOW__$V_A$) in accordance with a following expression:

LOW$_{13}$ $V_A = \Sigma_K(P_K V_{K+1})$ wherein K is a predetermined variable corresponding to a position of a particular sample $V_K$ in the ordered plurality of samples $V_K$, said K variable ranging from a lower predetermined value $K_{min}$ to a higher predetermined value $K_{max}$, wherein $P_K$ is a probability value determined for each particular value of K in accordance with a following expression:

$$P_K = \binom{N}{K} A^K (1-A)^{N-K};$$

wherein A is a predetermined variable representative of desired accuracy of $V_A$ determination, and wherein N is a value representative of an amount of $V_K$ samples in the plurality of ordered samples $V_K$, and (2) the high limit value of $V_A$(HIGH__$V_A$) in accordance with a following expression:

HIGH__$V_A = \Sigma_K(P_K V_K)$ for said variable K ranging from said value $K_{min}$ to said value $K_{max}$; and output means connected to said first control means for providing an output of the range of expected values of $V_A$, the range comprising the low limit value LOW__$V_A$ and the high limit value HIGH__$V_A$, such that said range of expected values of $V_A$ is available for utilization, by at least one of a financial analyst or a secondary financial analysis data processing system, for decision making in connection with the financial portfolio.

8. The system of claim 1, wherein said value $K_{min}$ is set to 1, and wherein said value $K_{max}$ is set to said value N.

9. The system of claim 1, wherein said simulation means comprises a data simulation system operated in accordance with one of Monte-Carlo simulation or Historical simulation.

10. The system of claim 7, further comprising:

first determining means for determining a value of $P_K$ for K equal to a predetermined variable $n_A$;

defining means, responsive to said first determining means, for setting a variable Y equal to 1, and for setting said values $K_{min}$ and $K_{max}$ to equal $n_A$;

second control means, responsive to said defining means, for determining said values of $K_{min}$ and $K_{max}$, comprising:

second determining means for determining a value of $P_K$ for K equal to $n_A+Y$;

third determining means, responsive to said second determining means, for determining a sum of all $P_K$ values determined thus far;

third control means, responsive to said third determining means, for comparing said sum to a predetermined value $P_T$, and when said sum is one of substantially equal to or greater than said value $P_T$, setting $K_{max}$ equal to $n_A+Y$;

first trigger means, responsive to said third control means, for triggering, when said sum is less than said value $P_T$:

(1) said second determining means to determine a value of $P_K$ for K set equal to $n_A-Y$, and (2) said third determining means to determine a sum of all $P_K$ values determined thus far;

(3) said third control means to compare said sum to said predetermined value $P_T$, and when said sum is one of substantially equal to or greater than said value $P_T$, setting $K_{min}$ equal to $n_A-Y$, and setting $K_{max}$ equal to $n_A+Y$;

increment means, responsive to said third control means, for incrementing said variable Y by 1 when said sum is less than said value $P_T$; and second trigger means, responsive to said third control means, for triggering said second determining means when said sum is less than said value $P_T$.

11. The system of claim 10, wherein said third control means further comprises:

means for determining whether $n_A-Y$ is one of less than or equal to 1;

means for, when $n_A-Y$ is one of less than or equal to 1, setting $K_{min}$ equal to 1, and deactivating said first trigger means.

12. The system of claim 10, further comprising means for storing said values $K_{min}$ and $K_{max}$ in association with said value N in said memory means, such that at a later time said $K_{min}$ and $K_{max}$ will be known for said value N.

13. The system of claim 12, further comprising means for determining, prior to activation of said first control means, whether said values $K_{min}$ and $K_{max}$ are stored in said memory means for said value N, and:

(1) when said values $K_{min}$ and $K_{max}$ are stored in said memory means for said value N, retrieving said values $K_{min}$ and $K_{max}$ and triggering said first control means; and (2) when said values $K_{min}$ and $K_{max}$ are not stored in said memory means for said value N, triggering said first determining means to determine values $K_{min}$ and $K_{max}$, and, after said values $K_{min}$ and $K_{max}$ are determined, triggering said first control means.

14. A data processing method, implemented in a data processing system having a memory and an output device, for assisting in a financial risk analysis of a financial portfolio by determining a range of an expected value of a value-at-risk ($V_A$) of a financial portfolio, the range having a low limit value and a higher limit value, the financial portfolio comprising a plurality of financial data samples ($V_K$) ordered from smallest to largest, the method comprising the steps of:

(a) receiving, by the data processing system, said plurality of samples $V_K$;

(b) determining, by the data processing system, the low limit value of $V_A$(LOW_$V_A$) in accordance with a following expression:

$$\text{LOW\_}V_A = \Sigma_K(P_K V_{K+1})$$

wherein K is a predetermined variable corresponding to a position of a particular sample $V_K$ in the ordered plurality of samples $V_K$, said K variable ranging from a lower predetermined value $K_{min}$ to a higher predetermined value $K_{max}$, wherein $P_K$ is a probability value determined for each particular value of K in accordance with a following expression:

$$P_K = \binom{N}{K} A^K (1-A)^{N-K};$$

wherein A is a predetermined variable representative of desired accuracy of $V_A$ determination, and wherein N is a value representative of an amount of $V_K$ samples in the plurality of ordered samples $V_K$;

(c) determining, by the data processing system, the high limit value of $V_A$(HIGH_$V_A$) in accordance with a following expression:

$$\text{HIGH\_}V_A = \Sigma_K(P_K V_K)$$

for said variable K ranging from said value $K_{min}$ to said value $K_{max}$; and (d) providing, by the output device, an output of the range of expected values of $V_A$, the range comprising the low limit value LOW_$V_A$ and the high limit value HIGH_$V_A$, such that said range of expected values of $V_A$ is available for utilization, by at least one of a financial analyst or a secondary financial analysis data processing system, for decision making in connection with the financial portfolio.

15. The method of claim 14, wherein said value $K_{min}$ is set to 1, and wherein said value $K_{max}$ is set to said value N.

16. The method of claim 14, further comprising:

(e) prior to said step (b), determining, by the data processing system, a value of $P_K$ for K equal to a predetermined variable $n_A$;

(f) setting, by the data processing system, a variable Y equal to 1, and setting said values $K_{min}$ and $K_{max}$ to equal $n_A$;

(g) determining, by the data processing system, a value of $P_K$ for K equal to $n_A+Y$;

(h) determining, by the data processing system, a sum of all $P_K$ values determined thus far;

(i) comparing, by the data processing system, said sum to a predetermined value $P_T$, and when said sum is one of substantially equal to or greater than said value $P_T$, setting $K_{max}$ equal to $n_A+Y$ and returning to said step (b); and (j) when said sum is less than said value $P_T$:

(1) determining, by the data processing system, a value of $P_K$ for K set equal to $n_A-Y$, and (2) repeating, by the data processing system, said step (h);

(3) comparing, by the data processing system, said sum to said predetermined value $P_T$, and:

(A) when said sum is one of substantially equal to or greater than said value $P_T$, setting, by the data processing system, $K_{min}$ equal to $n_A-Y$, and setting, by the data processing system, $K_{max}$ equal to $n_A+Y$ and returning to said step (b);

(B) when said sum is less than said value $P_T$, incrementing, by the data processing system, said variable Y by 1; and returning to said step (g).

17. The method of claim 16, further comprising the step of:

(k) determining, by the data processing system after said step (j)(1) whether $n_A-Y$ is one of less than or equal to 1, and when $n_A-Y$ is one of less than or equal to 1, setting $K_{min}$ equal to 1, incrementing, by the data processing system, said variable Y by 1 and returning to said step (g).

18. The method of claim 16, further comprising the step of:

(1) storing, by the data processing system, said values $K_{min}$ and $K_{max}$ in the memory in association with said value N, such that at a later time said $K_{min}$ and $K_{max}$ will be known for said value N.

19. The method of claim 18, further comprising the step of:

(m) determining, by the data processing system prior to said step (b), whether said values $K_{min}$ and $K_{max}$ are stored in the memory for said value N, and:
   (1) when said values $K_{min}$ and $K_{max}$ are stored in the memory for said value N, retrieving, by the data processing system, said values $K_{min}$ and $K_{max}$ from said memory and proceeding to said step (b), and
   (2) when said values $K_{min}$ and $K_{max}$ are not stored in the memory for said value N, proceeding to said step (e).

20. A data processing method, implemented in a data processing system having a memory and an output device, for assisting in a financial risk analysis of a financial portfolio by determining a range of an expected value of a value-at-risk ($V_A$) of a financial portfolio representative of financial data, the range having a low limit value and a higher limit value, the method comprising steps of:

(a) storing the financial portfolio in said memory;

(b) generating, by the data processing system, a plurality of financial data samples ($V_K$) of variable magnitude from said financial portfolio in accordance with a predetermined data simulation scheme;

(c) sorting, by the data processing system, said samples $V_K$ from smallest to largest in magnitude;

(d) determining, by the data processing system, the low limit value of $V_A$(LOW_$V_A$) in accordance with a following expression:

$$LOW\_V_A = \Sigma_K(P_K V_{K+1})$$

wherein K is a predetermined variable corresponding to a position of a particular sample $V_K$ in the ordered plurality of samples $V_K$, said K variable ranging from a lower predetermined value $K_{min}$ to a higher predetermined value $K_{max}$, wherein $P_K$ is a probability value determined for each particular value of K in accordance with a following expression:

$$P_K = \binom{N}{K} A^K (1-A)^{N-K};$$

wherein A is a predetermined variable representative of desired accuracy of $V_A$ determination, and wherein N is a value representative of an amount of $V_K$ samples in the plurality of ordered samples $V_K$;

(e) determining, by the data processing system, the high limit value of $V_A$(HIGH_$V_A$) in accordance with a following expression:

$$HIGH\_V_A = \Sigma_K(P_K V_K)$$

for said variable K ranging from said value $K_{min}$ to said value $K_{max}$; and (f) providing, by the output device, an output of the range of expected values of $V_A$, the range comprising the low limit value LOW_$V_A$ and the high limit value HIGH_$V_A$, such that said range of expected values of $V_A$ is available for utilization, by at least one of a financial analyst or a secondary financial analysis data processing system for decision making in connection with the financial portfolio.

21. The method of claim 20, wherein said value $K_{min}$ is set to 1, and wherein said value $K_{max}$ is set to said value N.

22. The method of claim 20, further comprising:

(g) prior to said step (d), determining, by the data processing system, a value of $P_K$ for K equal to a predetermined variable $n_A$;

(h) setting, by the data processing system, a variable Y equal to 1, and setting said values $K_{min}$ and $K_{max}$, to equal $n_A$;

(i) determining, by the data processing system, a value of $P_K$ for K equal to $n_A+Y$;

(j) determining, by the data processing system, a sum of all $P_K$ values determined thus far;

(k) comparing, by the data processing system, said sum to a predetermined value $P_T$, and when said sum is one of substantially equal to or greater than said value $P_T$, setting $K_{max}$ equal to $n_A+Y$ and returning to said step (d); and (l) when said sum is less than said value $P_T$:
   (1) determining, by the data processing system, a value of $P_K$ for K set equal to $n_A-Y$, and
   (2) repeating, by the data processing system, said step (j);
   (3) comparing, by the data processing system, said sum to said predetermined value $P_T$, and:
      (A) when said sum is one of substantially equal to or greater than said value $P_T$, setting, by the data processing system, $K_{min}$ equal to $n_A-Y$, and setting, by the data processing system, $K_{max}$ equal to $n_A+Y$ and returning to said step (d);
      (B) when said sum is less than said value $P_T$, incrementing, by the data processing system, said variable Y by 1; and returning to said step (i).

23. The method of claim 22, further comprising the step of:

(m) determining, by the data processing system after said step (l)(1) whether $n_A-Y$ is one of less than or equal to 1, and when $n_A-Y$ is one of less than or equal to 1, setting, by the data processing system, $K_{min}$ equal to 1, incrementing, by the data processing system, said variable Y by 1 and returning to said step (i).

24. The method of claim 22, further comprising the step of:

(n) storing, by the data processing system, said values $K_{min}$ and $K_{max}$ in the memory in association with said value N, such that at a later time said $K_{min}$ and $K_{max}$ will be known for said value N.

25. The method of claim 24, further comprising the step of:

(o) determining, by the data processing system prior to said step (d), whether said values $K_{min}$ and $K_{max}$ are stored in the memory for said value N, and:
   (1) when said values $K_{min}$ and $K_{max}$ are stored in the memory for said value N, retrieving, by the data processing system, said values $K_{min}$ and $K_{max}$ from the memory and proceeding to said step (d), and (2) when said values $K_{min}$ and $K_{max}$ are not stored in the memory for said value N, proceeding to said step (g).

26. The method of claim 20, wherein said predetermined data simulation scheme is one of a Monte Carlo simulation, a Historical simulation, or a Scenario simulation.

27. The system of claim 10, wherein a predetermined said first determining means comprise means for determining a value of said variable $n_A$ in accordance with a following expression:

$n_A$=closest integer value to $0.01*A*N$.

28. The method of claim 16, further comprising the step of:

(p) prior to said step (e), determining a value of said variable $n_A$ in accordance with a following expression:

$n_A$=closest integer value to $0.01*A*N$.

* * * * *